United States Patent
Moore, Jr. et al.

(10) Patent No.: US 11,833,999 B2
(45) Date of Patent: Dec. 5, 2023

(54) KEYLESS PATTERN-BASED MECHANISM FOR UNLOCKING VEHICLE

(71) Applicant: International Business Machines Corporation, Armonk, NY (US)

(72) Inventors: John E. Moore, Jr., Pflugerville, TX (US); Humberto Orozco Cervantes, Tonalá (MX); Paul Llamas Virgen, Zapopan (MX); Luisa Alejandra Rizo Lameiras, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/406,317

(22) Filed: Aug. 19, 2021

(65) Prior Publication Data
US 2023/0054649 A1 Feb. 23, 2023

(51) Int. Cl.
*B60R 25/24* (2013.01)
*G07C 9/22* (2020.01)
*G07C 9/00* (2020.01)

(52) U.S. Cl.
CPC .......... *B60R 25/24* (2013.01); *G07C 9/00309* (2013.01); *G07C 9/22* (2020.01); *B60R 2325/20* (2013.01); *G07C 2009/00388* (2013.01)

(58) Field of Classification Search
None
See application file for complete search history.

(56) References Cited

U.S. PATENT DOCUMENTS

| | | | |
|---|---|---|---|
| 9,373,201 B2 * | 6/2016 | Jefferies | G06Q 30/0645 |
| 9,870,665 B2 | 1/2018 | Maiwand | |
| 10,246,055 B2 | 4/2019 | Farges | |
| 10,504,309 B2 | 12/2019 | Choi | |
| 2020/0186605 A1 * | 6/2020 | Rakshit | H04L 67/30 |

FOREIGN PATENT DOCUMENTS

| | | |
|---|---|---|
| CN | 100558574 C | 11/2009 |
| CN | 105346506 A | 2/2016 |
| CN | 107888559 A | 4/2018 |
| CN | 110239486 A | 9/2019 |

(Continued)

OTHER PUBLICATIONS

"An IoT based vehicle security system using unique human mannerism and multiple customizable touch pattern sensors", An IP.com Prior Art Database Technical Disclosure, Authors et. al.: Disclosed Anonymously, IP.com No. IPCOM000255381D, IP.com Electronic Publication Date: Sep. 21, 2018, 5 pages.

(Continued)

*Primary Examiner* — Carlos Garcia
(74) *Attorney, Agent, or Firm* — Monchai Chuaychoo

(57) ABSTRACT

An approach for the unlocking a vehicle is disclosed. The approach determines a plurality of devices of one or more users and one or more unlocking protocols associated with one or more vehicles, requests a user unlock action command by at least one of the plurality of devices. The approach receives a user unlock action complete command from at least one of the plurality of devices and validates the user unlock action complete command against the one or more unlocking protocols. Finally, after successful authentication, the approach unlocks the one or more vehicles.

20 Claims, 5 Drawing Sheets

(56) References Cited

FOREIGN PATENT DOCUMENTS

| CN | 110381199 | A  | 10/2019 |
|----|-----------|----|---------|
| CN | 112477807 | A  | 3/2021  |
| FR | 3107155   | A1 | 8/2021  |
| JP | 2018141264| A  | 9/2018  |
| KR | 100766188 | B1 | 10/2007 |
| KR | 101928951 | B1 | 12/2018 |
| RU | 2669328   | C2 | 10/2018 |
| WO | 2020140898| A1 | 7/2020  |
| WO | 2020202343| A1 | 10/2020 |
| WO | 2023020433| A1 | 2/2023  |

OTHER PUBLICATIONS

"Disruptive automotive technology solutions", IBM, downloaded from the internet on Aug. 5, 2021, 9 pages, <https://www.ibm.com/industries/automotive>.

"Fingerprint Recognition for the Car: Use Cases and Design Considerations", Electronic Design, Dec. 23, 2019, 13 pages, <https://www.electronicdesign.com/markets/automotive/article/21119162/fingerprint-recognition-for-the-car-use-cases-and-design-considerations>.

Su, Jeb, "Hyundai Motor Lets Drivers Use Fingerprints To Unlock And Start Its New Cars", Forbes, Dec. 27, 2018, 5 pages, <https://www.forbes.com/sites/jeanbaptiste/2018/12/27/hyundai-motor-lets-drivers-use-fingerprints-to-unlock-and-start-new-car/?sh=107394e53050>.

Velikkal, Rajeev, "Biometric Car Entry—True Keyless Car", Hackster.io, Jan. 4, 2019, 6 pages, <https://www.hackster.io/rajeevvelikkal/biometric-car-entry-true-keyless-car-298928>.

International Search Report and Written Opinion, International Application No. PCT/CN2022/112503, International Filing Date Aug. 15, 2022, 10 pages.

* cited by examiner

KEYLESS PATTERN-BASED MECHANISM FOR UNLOCKING VEHICLE

BACKGROUND

The present invention relates generally to automotive industry, and more particularly to vehicle access systems.

In the United States, a vehicle is stolen every 21 seconds. Just in 2019, $64 billion was lost due to car theft. Even though the numbers have decreased, thieves are constantly developing and using new and more sophisticated ways to compromise car security. For example, thieves are using ways such as, 1) smart wireless keys that replicate the access code of a certain vehicle, 2) to connecting a computer to the diagnostic system and reprogramming a new code that allows them to start the car and 3) using a jammer that inhibits the signal from the car preventing the doors from closing or signal amplifiers and repeaters that allow them to open the car even if the car key is in a long distance.

SUMMARY

Aspects of the present invention disclose a computer-implemented method, a computer system and computer program product unlocking a vehicle. The computer implemented method may be implemented by one or more computer processors and may include, determining a plurality of devices of one or more users and one or more unlocking protocols associated with one or more vehicles; requesting a user unlock action command by at least one of the plurality of devices, receiving a user unlock action complete command from at least one of the plurality of devices; validating the user unlock action complete command against the one or more unlocking protocols; and unlocking the one or more vehicles based on successful validation of the user unlock action complete command.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
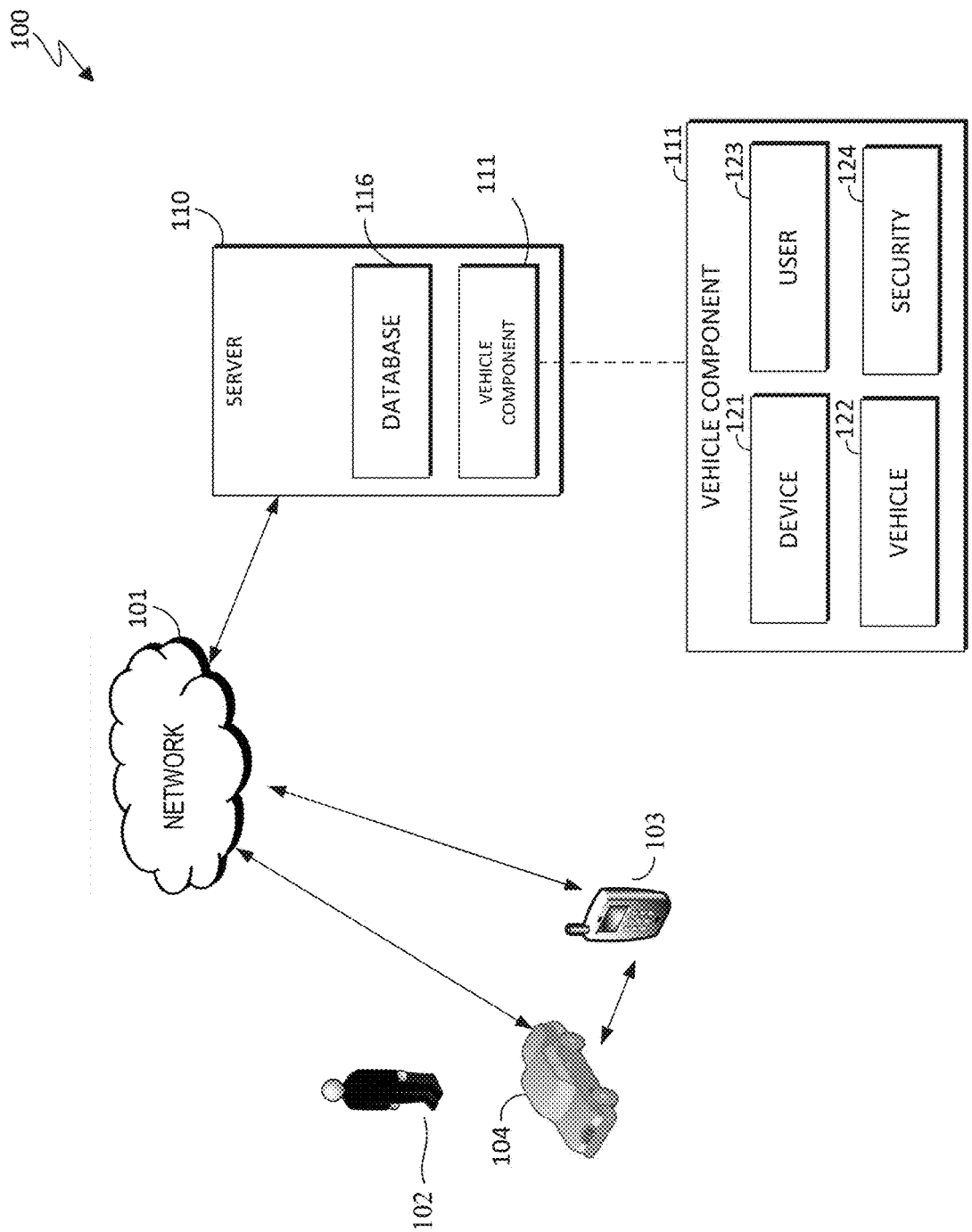
FIG. 1 is a functional block diagram illustrating a vehicle management environment, designated as 100, in accordance with an embodiment of the present invention.

Embodiments of the present invention recognizes the deficiencies in the current state of art as it relates preventing unauthorized access to vehicles and provides an approach for addressing those deficiencies. The approach comprises of utilizing multiple electronic devices to unlock a vehicle. The electronic devices (e.g., IoT devices, smartphone, watch, etc.) are first recognized/registered by the vehicle as belonging to the authorized person (i.e., owner of the vehicle). After the first trip with the vehicle, the vehicle will instruct the electronic devices with a series of dynamic patterns and/or actions where the user must perform correctly in order to gain access to the vehicle.

Some embodiments may add another level of security since additional to requiring the key to develop a pattern and unlock the car, for example, the user would need other devices with will allow the system to create different and dynamic patterns each time the user wants to unlock the car, generating them based on the devices the driver and their companions have and that have been added as safe devices to the system.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a vehicle management environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Vehicle management environment 100 includes network 101, users 102, electronic devices 103, vehicles 104 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110 and other computing devices (not shown) within Vehicle management environment 100. It is noted that other computing devices can include, but is not limited to, any electromechanical devices capable of carrying out a series of computing instructions.

Users 102 are authorized owners or authorized to drive and/or ride in a vehicle (i.e., 104). They can be passengers (with permission from authorized owners).

Electronic devices 103 are electronic devices capable of transmitting data from the device over a network to another computing device. Electronic devices 103 can include IoT (internet of things) devices as well as smart phones and smart wearable devices (e.g., wristbands, watches, earbuds, etc.).

Vehicles 104 are vehicles used for transportation equipped with the capability of interfacing/communicating with electronic devices 103 and server 110. Vehicle 104 can be a car, truck, two-wheel/three-wheel motorcycle, personal watercraft, boats and any vehicle (e.g., land, water or air based) capable of transporting passengers and/or cargo.

Server 110 and electronic devices 103 can be a standalone computing device, a management server, a web server, a mobile computing device, or any other electronic device or computing system capable of receiving, sending, and processing data. In other embodiments, server 110 and electronic devices 103 can represent a server computing system utilizing multiple computers as a server system, such as in a cloud computing environment. In another embodiment, server 110 and electronic devices 103 can be a laptop computer, a tablet computer, a netbook computer, a personal computer (PC), a desktop computer, a personal digital assistant (PDA), a smart phone, or any other programmable electronic device capable of communicating other computing devices (not shown) within vehicle management environment 100 via network 101. In another embodiment, server 110 and electronic devices 103 represents a computing system utilizing clustered computers and components (e.g., database server computers, application server computers, etc.) that act as a single pool of seamless resources when accessed within vehicle management environment 100.

Embodiment of the present invention can reside on server 110 or on electronic devices 103. Server 110 includes vehicle component 111 and database 116.

Vehicle component 111 provides the capability of managing IoT and other electronic devices and allowing/denying access to the vehicle based on the correct/incorrect action performed by the user(s).

In one embodiment, the general steps utilizing vehicle component 111 can include: 1) secure device trusted ecosystems generation (vehicle, IoT devices and patterns); 2) error-tolerant device pattern generation given device's availability; 3) validation of devices used to generate dynamic pattern; 4) pattern-based key dynamic generation; 5) pattern transmission to the computed devices; 6) user execute predefined pattern for car unlocking; and 7) vehicle unlocking successful.

Vehicle component 111 contains subcomponents: device component 121, vehicle component 122, user component 123 and security component 124.

As is further described herein below, device component 121 of the present invention provides the capability of 1) discovering new electronic devices 103, 2) registering new electronic device 103 and 3) managing a registered electronic devices 103. For example, userA owns one smartphone and smartwatch.

As is further described herein below, vehicle component 122 of the present invention provides the capability of communicating with vehicles 104 and managing a possible multiple vehicles belonging to one or multiple users. For example, userA may own a smart car, personal watercraft and motorcycle.

As is further described herein below, user component 123 of the present invention provides the capability of managing a one or more users (i.e., profiles) associated with vehicles 104 and/or electronic devices 103. For example, user component 123 recognizes that userA owns three vehicles (e.g., a smart car, personal watercraft and motorcycle) and two smart devices (e.g., phone and watch).

As is further described herein below, security component 124 of the present invention provides the capability of applying stored security rules/protocols to allow or not allow access to vehicles 104 via electronic devices 103. For example, security component 124 instructs the smart phone of userA to request a unique PIN from userA in order to gain access to his motorcycle. It is noted that store security rules can be pre-programmed by the user or can be dynamically altered by an AI sub-component that learns the pattern/habits of the user. AI sub-component of security component 124 may learn by training or may learn by self-learning based on, but it is not limited to, best industry practices, trends in vehicle security, trends in cybersecurity and other online resources.

Rules:

The idea is to generate dynamic rules for unlocking and/or starting a car based on the pattern actions defined and taking in consideration the analysis of the plurality of devices from the driver or any trusted passenger.

A central system will be in charge of generating the patterns, depending on the configured and available trusted devices from the driver or any known passenger's devices. Once the dynamic patterns have been generated by the system, the user will be notified by any of the same devices or in a particular interface of the car, these patterns must be executed according to a defined and configurable accuracy margin, in order to comply with the requirements and allow access to the vehicle.

To exemplify the possible rules that will be defined in the system, the mechanism can be based, but not limited to, the use of the user's location in reference to the vehicle, for example, that the user has to maintain certain meters of distance during a certain period, time, another example can be based on the use of a plurality of devices that combine the said location factor, this can be extrapolated to the interaction of the rest of the passengers of the vehicle, for example that both users maintain a certain distance from the vehicle with their own ranges of distance and with different times.

The detailed description of each point is described as follows (as 1-6 rules):

Rule 1) configure mechanism to detect personal or shared devices to add them manually to trusted ecosystem. Rule 2) the car detects the devices around in a specific period of time after they are added to a trusted ecosystem. Rule 3) the car detects physical characteristics of each device and ensure be up when they are back, depending on the history usage. (Level of battery, network signal, CPU consumption, memory, etc.).

Rule 4) Based on the devices around from the driver or any trusted passenger once the driver starts a new trip the system creates a plurality of possible unlocking mechanisms: a) For instance: In case device 1, 2 and 3 are present and the location is high traffic store parking lot, the mechanism could propose a more robust pattern since it could be a risky environment to ensure the devices be used to unlock the car and keep the engine disabled in case they are not present and b) The driver accepts the devices involved in the next unlock before leaving the car, but the car does not share the pattern itself.

Rule 5) when the driver and/or passengers come back to the car the mechanism asks for unlocking protocols. The unlocking protocols can be specific actions (pattern) for different devices: a) shake wristband, smartwatch, b) shake device 1 and approach device 2 to car NFC reader, c) get device 1 away at least 5 meters from device 2, d) try to unlock after 1 hour with device, e) interaction from device 1 and device 2 by NFC touching each other, f) combination of the previous steps (a through e) and g) others. Additionally, unlocking protocols can include voice identification on the plurality of devices and biometric identification on the plurality of devices.

Rule 6) In case there are no devices available the user could skip that pattern. It is noted that this is not an exhaustive list of all the rules. Users and/or AI (through self learning) may add new rules, edit existing rules to suit the needs.

Database 116 is a repository for data used by vehicle component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within vehicle management environment 100, provided that vehicle component 111 has access to database 116. Database 116 may store information associated with, but is not limited to, best industry practices relating to security, trends in vehicle security, trends in cybersecurity, other online resources, profiles of users, list and specifications of electronic devices, security rules created by users and/or AI subcomponent, list of vehicles, unlocking protocols, user unlock command and user unlock action complete command.

Figure 2A:
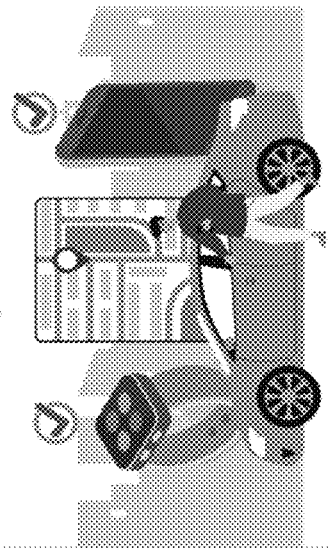
FIG. 2A is a use case example illustrating vehicle management environment 100, in accordance with an embodiment of the present invention.
Figure 2A:
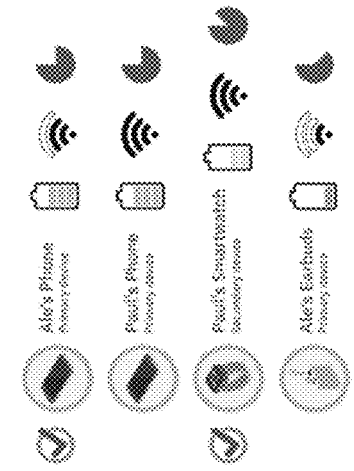
Figure 2A:
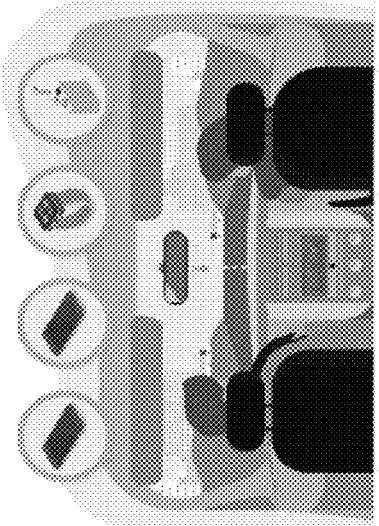
Figure 2A:
Figure 2A:
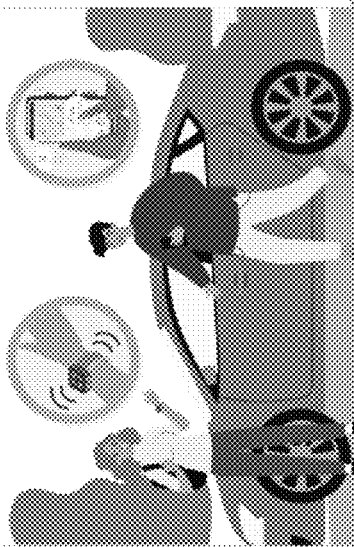
Figure 2A:
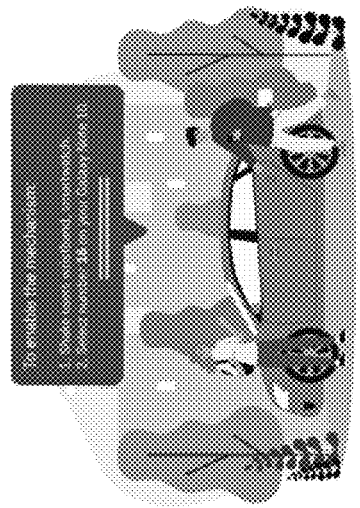

FIG. 2A is a use case example illustrating vehicle management environment 100, in accordance with an embodiment of the present invention. Block 201 illustrates the electronic device registration process with the vehicle. Block 202 illustrates the vehicle managing the list of electronic devices authorized for the vehicle. Block 203 illustrates the security protocol/rules that can be utilized after the first trip with the vehicle. Block 204 illustrates when a user attempts to unlock the vehicle (first time after registering). Block 205 illustrates the sequence of actions that the users may be required to perform by the vehicle to gain access. Block 206 illustrates that the action performed by the user was satisfactory to gain access to the vehicle.

Figure 2B:
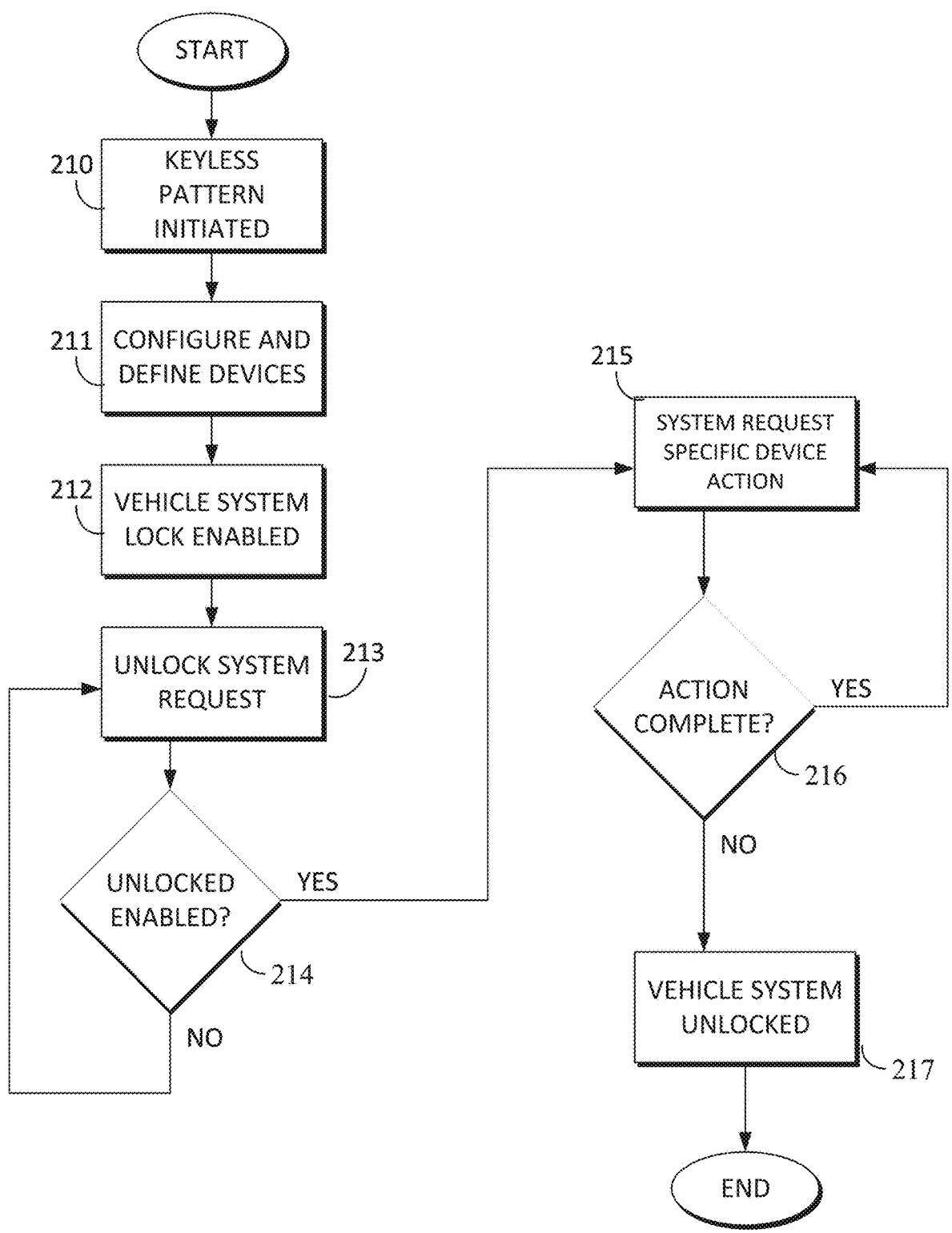
FIG. 2B is high-level flowchart illustrating the operation of vehicle component 111, in accordance with an embodiment of the present invention.

FIG. 2B is high-level flowchart illustrating the operation of vehicle component 111, in accordance with an embodiment of the present invention. Step 210 begins with vehicle component 111 initiating a keyless pattern. Step 211, vehicle component 111 configures and define devices (e.g., IoT devices, smart devices, etc.). Step 212, vehicle component 111 enables the system lock on the vehicle (after the user leave the vehicle). Step 213, vehicle component 111 receives an unlock request form the user (via electronic devices). Step 214, vehicle component 111 validates whether the unlocked feature is enabled or not. If the unlock feature of the vehicle is enabled then the next step is for the vehicle component 111 to request a pattern/action from the user (step 215). Step 216, vehicle component 111 validates whether the action/pattern was completed by the user (i.e., via electronic devices 103) correctly. Step 217, vehicle component 111 unlocks the vehicle based on the correct action/pattern was performed by the user.

Figure 3:
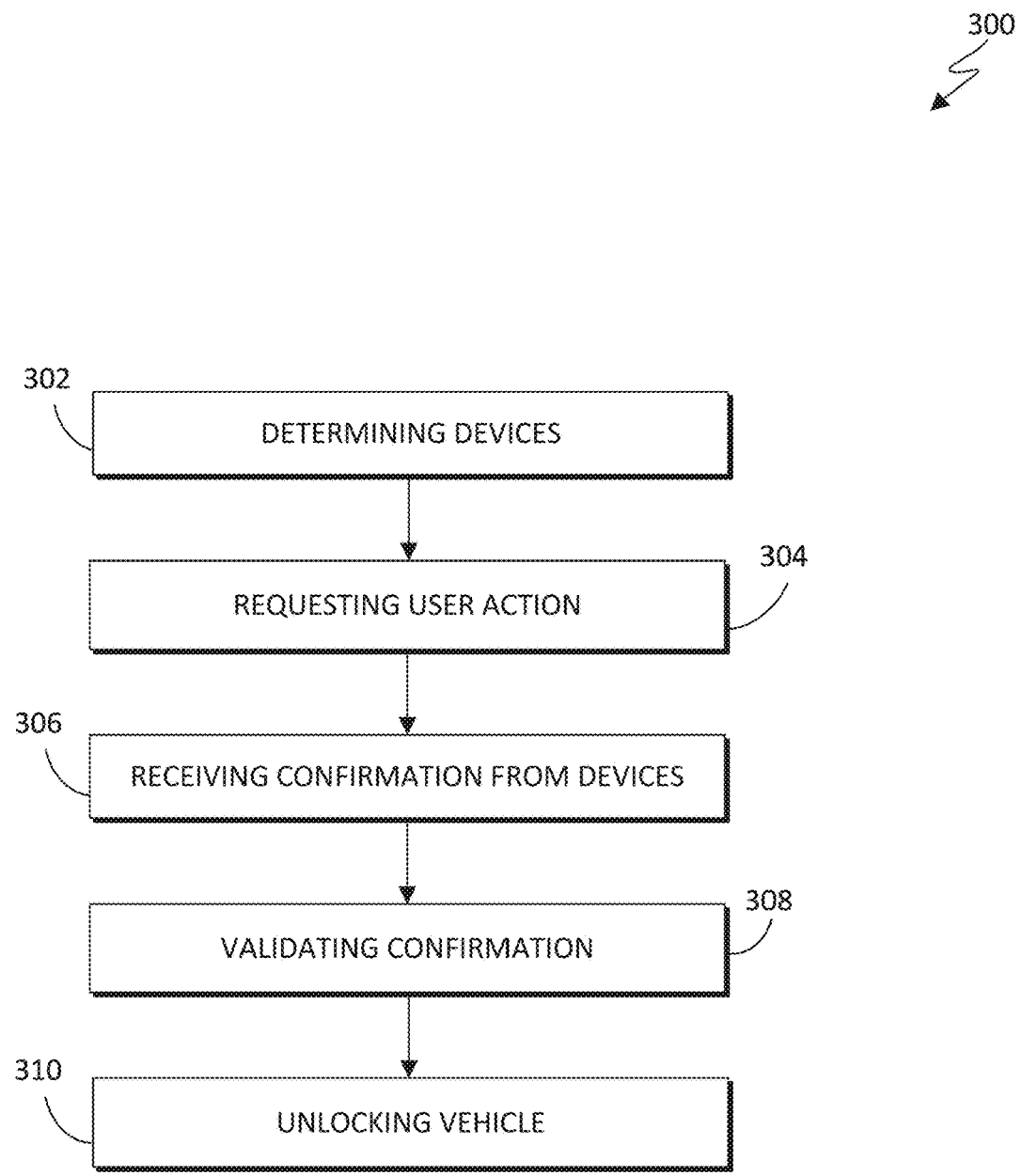
FIG. 3 is a high-level flowchart illustrating the operation of vehicle component 111, designated as 300, in accordance with another embodiment of the present invention.

FIG. 3 is a high-level flowchart illustrating the operation of vehicle component 111, designated as process 300, in accordance with another embodiment of the present invention.

In some embodiments, vehicle component 111, through device component 121, user component 123 and vehicle component 122 determines devices belonging to users during a first trip on the vehicle (step 302). For example, vehicle component 111 recognizes that userA owns three vehicles (e.g., a smart car, personal watercraft and motorcycle) and two smart devices (e.g., phone and watch). Currently, userA is taking a first trip in his smart car while carry his phone and watch. Thus, vehicle component 111 would register his phone and watch to his smart car.

Additionally, vehicle component 111, may determine unlocking protocols for the user based on, but is not limited to, location of the park vehicle, time of day, foot traffic, when the user returns to the vehicle. Unlocking protocols may include, but it is not limited to, swiping certain patterns on the phone, perform a series of movements on the wristwatch, swiping/clicking on the smart watch and speaking (voice identification) into the smart phone/watch. Thus, vehicle component 111 may determine that the user needs to use his smartphone (and follow a series of instructions) to unlock the vehicle and promptly notifies the user of this fact before leaving the vehicle. For example, userA parks his vehicle at a grocery store, the vehicle informs him that he will need to use the smartphone to unlock his car when he comes back.

Vehicle component 111 requests a user action by one of devices (step 304). Vehicle component 111 had detected that the user has return to the vehicle and the user is requesting access to the vehicle. For example, userA has finished buying groceries and is approaching the vehicle. The vehicle can detect the presence of the userA as the user is within the Bluetooth radius (via Bluetooth of the smartphone) of the vehicle.

Vehicle component 111, through security component 124, sends user unlock action command to the user via electronic device 103 of the user. For example, vehicle component 111 may ask userA to perform an action on his smart phone by making a swipe in the shape of the letter "M". Essentially, a user unlock action command is a series of information that contains instructions/actions to be performed by the user on his/her electronic device.

Vehicle component 111 receives a confirmation from one of the devices (step 306). Vehicle component 111, receives the user unlock action complete command from the device of the user. For example, userA completes the swipe on his phone in the shape of a letter, "M". His phone would send a "user unlock action complete command" back to the vehicle. Essentially, a user unlock action complete command is a series of information that contains the action performed by the user on his/her electronic device.

Vehicle component 111 validates the user unlock action complete command against one or more unlock protocols (step 308). Vehicle component 111, through security component 124, validates/authenticate whether the user action complete command satisfies the unlocking protocols from step 302. Any authentication method may be used between the device and the vehicle.

Vehicle component 111 unlocks the vehicle (step 310). Based on the result of the validation/authentication (successful), vehicle component 111 unlocks the vehicle for the user.

Figure 4:
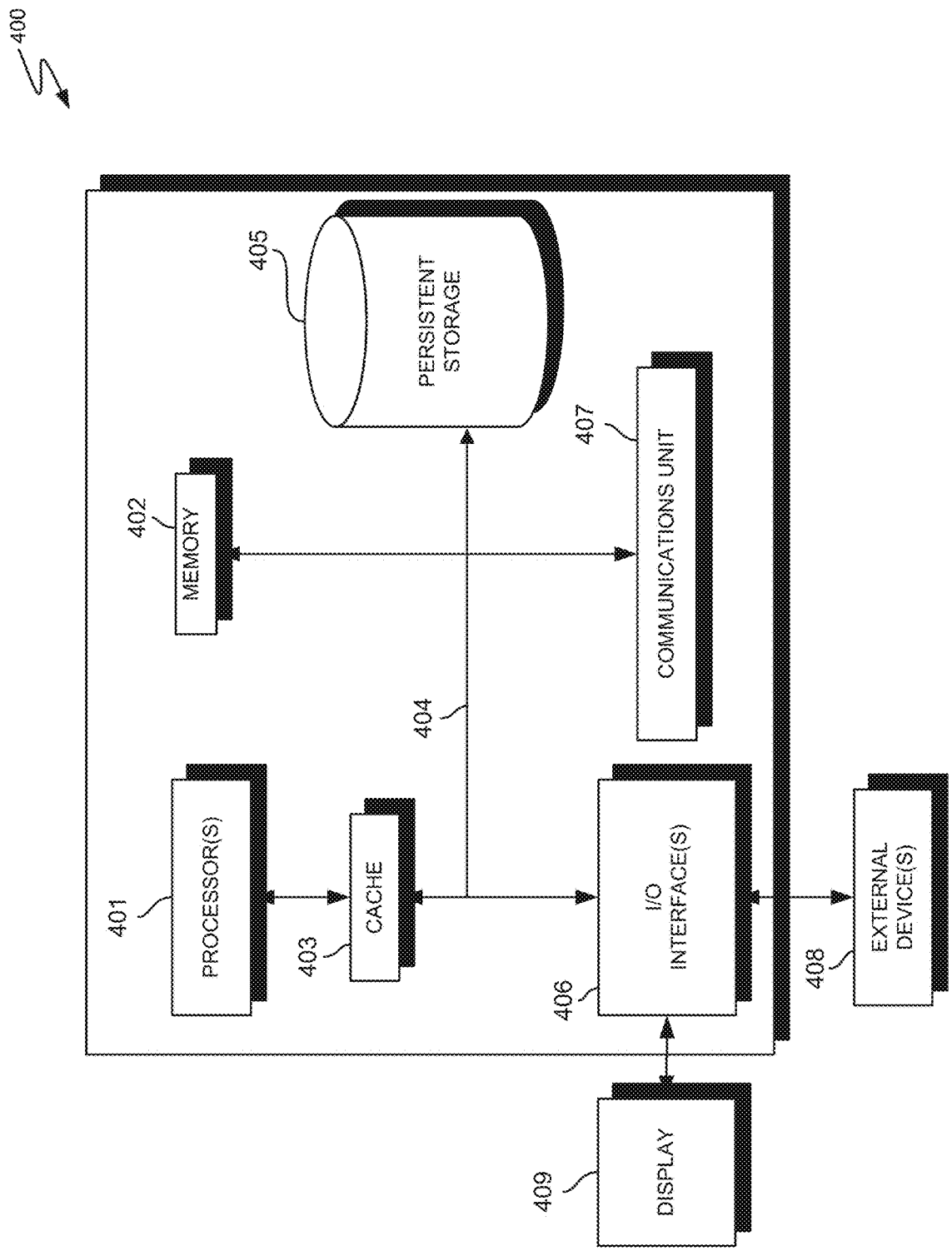
FIG. 4 depicts a block diagram, designated as 400, of components of a server computer capable of executing the vehicle component 111 within the vehicle management environment, of FIG. 1, in accordance with an embodiment of the present invention.

FIG. 4, designated as 400, depicts a block diagram of components of vehicle component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Vehicle component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., vehicle component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., vehicle component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for unlocking a vehicle, the method comprising:
    determining a plurality of devices of one or more users and one or more unlocking protocols associated with one or more vehicles, wherein the plurality of devices consisting one of a smartwatch, and smart wristband;
    requesting one or more users unlock action commands from the one or users, wherein the one or more users perform the one or more unlock action commands, in sequence, based on the one or more unlocking protocols and the one or more unlocking protocols is based on one or more unlock rules determined by the one or more users or an AI (artificial intelligence) subcomponent
    and wherein the one or more unlock rules consisting of:
    i) shaking a first device and a second device of the plurality of devices and wherein the first device is the smartwatch and the second device is the smart wristband,
    ii) shaking the first device and bring the second device closer to the vehicle and
    iii) moving the first device, at least 5 meters, from the second device and touching the first device against the second device;
    receiving one or more users unlock action complete command from at least one of the plurality of devices, wherein the one or more users unlock action complete command is a series of information that indicate actions performed by the one or more users based on the one or more users unlock action command;
    validating the one or more users unlock action complete command against the one or more unlocking protocols; and
    unlocking the one or more vehicles based on successful validation of the one or more users unlock action complete command.

2. The method of claim 1, the method comprising:
creating the one or more unlocking protocols;
editing the one or more unlocking protocols;
detecting, at least one of the plurality of devices after a first trip;
storing a list of the plurality of devices;
storing a list of the one or more users; and
storing a list of the one or more vehicles.

3. The method of claim 1, wherein determining the plurality of devices of the one or more users and the one or more unlocking protocols occurs during a first trip of the one or more vehicles.

4. The method of claim 1, wherein the AI subcomponent learns the pattern and habits of the one or more users to create a new unlocking protocols.

5. The method of claim 1, wherein the one or more user unlock action commands is chosen from the one or more unlocking protocols, wherein the one or more user unlock action commands was agreed by the one more users prior to exiting the one or more vehicles.

6. The method of claim 1, wherein the vehicle adds a trusted device from the plurality of devices based on either a specific period of time or manually added by the one or more users of the vehicle.

7. The method of claim 1, wherein validating the one or more user unlock action-complete command against the one or more unlocking protocols further comprises:
authenticating the one or more user unlock action complete command against the one or more user unlock action commands, wherein the one or more user unlock action commands is chosen from the one or more unlocking protocols and the one or more user unlock action command was agreed by the one more users prior to exiting the one or more vehicles.

8. A computer program product for unlocking a vehicle, the computer program product comprising:
one or more computer-readable storage media having computer-readable program instructions stored on the one or more computer-readable storage media said program instructions executes a computer-implemented method comprising the steps of:
determining a plurality of devices of one or more users and one or more unlocking protocols associated with one or more vehicles, wherein the plurality of devices consisting one of a smartwatch, and smart wristband;
requesting one or more users unlock action commands from the one or users, wherein the one or more users perform the one or more unlock action commands, in sequence, based on the one or more unlocking protocols and the one or more unlocking protocols is based on one or more unlock rules determined by the one or more users or an AI (artificial intelligence) subcomponent
and wherein the one or more unlock rules consisting of:
i) shaking a first device and a second device of the plurality of devices and wherein the first device is the smartwatch and the second device is the smart wristband,
ii) shaking the first device and bring the second device closer to the vehicle and
iii) moving the first device, at least 5 meters, from the second device and touching the first device against the second device;
receiving one or more users unlock action complete command from at least one of the plurality of devices, wherein the one or more users unlock action complete command is a series of information that indicate actions performed by the one or more users based on the one or more users unlock action command;
validating the one or more users unlock action complete command against the one or more unlocking protocols; and
unlocking the one or more vehicles based on successful validation of the one or more users unlock action complete command.

9. The computer program product of claim 8, wherein determining the plurality of devices of the one or more users and the one or more unlocking protocols occurs during a first trip of the one or more vehicles.

10. The computer program product of claim 8, wherein the AI subcomponent learns the pattern and habits of the one or more users to create a new unlocking protocols.

11. The computer program product of claim 8, wherein the one or more user unlock action commands is chosen from the one or more unlocking protocols, wherein the one or more user unlock action commands was agreed by the one more users prior to exiting the one or more vehicles.

12. The computer program product of claim 8, wherein the vehicle adds a trusted device from the plurality of devices based on either a specific period of time or manually added by the one or more users of the vehicle.

13. The computer program product of claim 8, wherein validating the one or more user unlock action-complete command against the one or more unlocking protocols further comprises:
authenticating the one or more user unlock action complete command against the one or more user unlock action commands, wherein the one or more user unlock action commands is chosen from the one or more unlocking protocols and the one or more user unlock action command was agreed by the one more users prior to exiting the one or more vehicles.

14. The computer program product of claim 8, the computer program product comprising:
creating the one or more unlocking protocols;
editing the one or more unlocking protocols;
detecting, at least one of the plurality of devices after a first trip;
storing a list of the plurality of devices;
storing a list of the one or more users; and
storing a list of the one or more vehicles.

15. A computer system for unlocking a vehicle, the computer system comprising:
one or more computer processors; and
one or more computer readable storage media having computer-readable program instructions stored on the one or more computer readable storage media, said program instructions executes, by the one or more computer processors, a computer-implemented method comprising the steps of:
determining a plurality of devices of one or more users and one or more unlocking protocols associated with one or more vehicles, wherein the plurality of devices consisting one of a smartwatch, and smart wristband;
requesting one or more users unlock action commands from the one or users, wherein the one or more users perform the one or more unlock action commands, in sequence, based on the one or more unlocking protocols and the one or more unlocking protocols is based on one or more unlock rules determined by the one or more users or an AI (artificial intelligence) subcomponent
and wherein the one or more unlock rules consisting of:
i) shaking a first device and a second device of the plurality of devices and wherein the first device is the smartwatch and the second device is the smart wristband,
ii) shaking the first device and bring the second device closer to the vehicle and
iii) moving the first device, at least 5 meters, from the second device and touching the first device against the second device;
receiving one or more users unlock action complete command from at least one of the plurality of devices, wherein the one or more users unlock action complete command is a series of information that indicate actions performed by the one or more users based on the one or more users unlock action command;
validating the one or more users unlock action complete command against the one or more unlocking protocols; and
unlocking the one or more vehicles based on successful validation of the one or more users unlock action complete command.

16. The computer system of claim 15, wherein determining the plurality of devices of the one or more users and the one or more unlocking protocols occurs during a first trip of the one or more vehicles.

17. The computer system of claim 15, wherein the AI subcomponent learns the pattern and habits of the one or more users to create a new unlocking protocols.

18. The computer system of claim 15, wherein the one or more user unlock action commands is chosen from the one or more unlocking protocols, wherein the one or more user unlock action commands was agreed by the one more users prior to exiting the one or more vehicles.

19. The computer system of claim 15, wherein the vehicle adds a trusted device from the plurality of devices based on either a specific period of time or manually added by the one or more users of the vehicle.

20. The computer system of claim 15, wherein validating the one or more user unlock action-complete command against the one or more unlocking protocols further comprises:
authenticating the one or more user unlock action complete command against the one or more user unlock action commands, wherein the one or more user unlock action commands is chosen from the one or more unlocking protocols and the one or more user unlock action command was agreed by the one more users prior to exiting the one or more vehicles.

* * * * *